United States Patent Office 2,856,154
Patented Oct. 14, 1958

2,856,154
DRILLING METHOD

Walter J. Weiss, Sugar Land, and Richard H. Graves, Bellaire, Tex., assignors to The Texas Company, New York, N. Y., a corporation of Delaware No Drawing. Application February 27, 1957
Serial No. 642,642

3 Claims. (Cl. 255—1.8)

This invention relates to the drilling of wells through subsurface formations by means of well drilling tools. More particularly, this invention relates to a drilling operation, such as a rotary drilling operation, which involves circulation of a drilling fluid through the well bore and about the drilling bit. In a rotary drilling operation a stream of drilling fluid is pumped down the drill stem to the drilling bit at the bottom of the bore hole. The stream of drilling fluid then passes through the drilling bit and moves upwardly through the annular space between the drill stem and the well bore wall carrying with it the drilling cuttings.

In some areas, such as in the area of the Gulf Coast of Texas and Louisiana, formations known as heaving or sloughing shales are penetrated during a well drilling operation. The penetration of these formations while employing conventional aqueous or water base drilling fluids has been difficult due to the mud-making property of heaving shales. These shales have a tendency to disintegrate by swelling or cracking upon contact with water with the result that the walls of the bore hole become unstable or incompetent and the heaving shale material making up the walls of the bore hole sloughs into the bore hole. In some instances the sloughing or moving of the heaving shale into the bore hole results in a stuck drill stem. In other instances the heaving shale material swells and caves into the bore hole with a resulting enlargement of the bore hole and the formation of a large subterranean cavity.

In addition to the above-indicated difficulties of maintaining a true bore hole when drilling through heaving shale with an ordinary water base mud, the resulting finely dispersed heaving shale taken into the drilling fluid adversely affects the viscosity characteristics thereof. Upon a continued accumulation of these finely divided heaving shale particles in the drilling fluid the viscosity of the drilling fluid increases with the result that the drilling fluid must be thinned by the addition of costly chemicals thereto or by dilution with water. As the drilling fluid is thinned the addition of weighting materials, such as barium sulfate, iron oxide, lead sulfide and the like is necessary to maintain a given mud weight.

Special drilling fluids or muds have been developed for drilling through heaving shale formations. One such drilling fluid which has been employed for drilling through heaving shale formations is a drilling fluid containing aqueous sodium silicate. Another drilling fluid which has been proposed for drilling through the less seriously dispersing or heaving shale formations is a high pH lime base drilling fluid which contains lime together with quebracho and caustic soda. Recently a drilling fluid has been developed which has been highly successful when employed for drilling through heaving shale. This drilling fluid contains a water soluble calcium salt, lime and a clay dispersing agent and is characterized as a relatively low pH, pH not greater than 12.6, aqueous drilling fluid characterized by an aqueous phase (filtrate) which is saturated with respect to calcium hydroxide and which possesses a relatively high calcium ion concentration, at least 200 parts per million by weight, preferably in the range 300–1000 parts per million by weight. This recently developed successful drilling mud is described in copending, coassigned patent application Serial No. 596,456, filed July 9, 1956, in the names of Walter J. Weiss and Wilbur L. Hall, now U. S. Patent 2,802,783, which application is a continuation-in-part of their patent application Serial No. 484,307, filed January 26, 1955, now abandoned. The disclosures of the foregoing patent applications are herein specifically expressly incorporated and made part of this disclosure.

Described more particularly, the above-referred recently developed highly successful drilling fluid is an alkaline aqueous water base drilling fluid characterized by a relatively high dissolved calcium or calcium ion content sufficient to effectively stabilize and control the mud-making properties of heaving shale or clays in contact with the drilling fluid. This drilling fluid comprises an alkaline aqueous phase (filtrate phase) which is saturated with respect to calcium hydroxide and contains a water soluble calcium salt having a solubility in said aqueous phase greater than that of calcium hydroxide dissolved therein in an amount sufficient to yield a dissolved calcium or calcium ion concentration in said aqueous phase of at least about 200 parts per million by weight. This drilling fluid also contains conventional dispersed hydratable drilling clay material together with a suitable dispersing agent therefor. If desired, there may also be incorporated in the drilling fluid oil such as a diesel oil, kerosene or a light fuel oil or lube oil fraction to form an oil-in-water emulsion therein. Any suitable clay dispersing agent may be employed with this drilling mud provided it is compatible therewith.

In the preparation of the foregoing drilling mud any suitable water soluble calcium salt may be employed in order to impart the desired calcium ion concentration in the aqueous phase therein. The water soluble calcium salt should be more soluble in water as measured at room temperature of about 10° C. than calcium hydroxide $Ca(OH)_2$. Satisfactory soluble calcium salts, inorganic or organic, which may be employed to yield the desired calcium ion concentration include calcium chloride $CaCl_2$, calcium sulfate $CaSO_4$, calcium acetate $$Ca(C_2H_3O_2)_2,$$

calcium formate $Ca(CHO_2)_2$, calcium nitrate $Ca(NO_3)_2$ and calcium gluconate $Ca(CH_2OH(CHOH)_4COO)_2$. Other suitable water soluble calcium salts may be employed.

The calcium hydroxide alkalinity agent present in the aqueous phase to substantially saturate the same may be added directly or may be formed in situ by metathetical reaction, e. g., a reaction involving a calcium salt such as calcium chloride and an alkali metal hydroxide such as caustic soda. Preferably lime is employed directly to furnish the calcium hydroxide required to saturate the aqueous phase of the drilling mud.

With respect to the clay dispersing agent employed in the mud, as indicated hereinabove, any suitable dispersant may be employed provided it is compatible within the drilling mud. Suitable dispersing agents include the various alkali metal and/or alkaline earth metal lignosulfonates such as sodium lignosulfonate, calcium lignosulfonate commercially available under the tradenames Kembreak and Lignox. Other suitable dispersing agents include yellow dextrin which is a degradation product of starch, Rayflo, a predominantly sodium salt of a polymeric polyphenol derivative obtained as an extract of hemlock bark. Another suitable lignosulfonate dispersing agent is a so-called heavy metal lignosulfonate, allegedly a ferro-chrome lignosulfonate sold under the tradename Q-Broxin.

While the foregoing drilling mud has been successfully employed in very many drilling operations it has been observed that in some instances when a conventional drilling mud, such as a high pH lime mud, is converted into the highly successful mud described hereinabove the expense of conversion is considerable, sometimes approaching $5,000, more or less. This rather high conversion cost, particularly in the case of a high pH lime base mud, arises due to the fact that a substantial amount of chemicals in the mud, such as caustic soda, lime and quebracho, must be neutralized or otherwise treated before the mud is satisfactorily converted. Further, in some instances the mud being converted contains components or agents therein which are incompatible with the resulting converted mud.

Accordingly it is an object of this invention to provide a drilling method employing special drilling muds.

It is another object of this invention to provide a drilling method wherein the mud conversion costs are substantially reduced.

It is another object of this invention to provide a drilling method employing special muds wherein one mud is converted to another mud by a relatively inexpensive and simple operation.

Still another object of this invention is to provide a drilling method wherein a shale control drilling mud described hereinabove is readily and relatively inexpensively prepared from another drilling mud.

These and other objects of this invention and how they are accomplished will readily become apparent to those skilled in the art in the light of the accompanying disclosure. In at least one embodiment of the practice of this invention at least one of the foregoing objects will be achieved.

In accordance with the teachings of this invention an improved drilling operation is obtainable and mud conversion costs maintained at a relatively low level when a previously employed drilling mud is converted to the hereinabove described shale control mud by employing as said previously employed drilling mud an aqueous drilling fluid characterized by an alkaline aqueous phase which is substantially saturated or saturated with calcium hydroxide, said aqueous phase having a dissolved calcium ion concentration therein less than 200 parts per million by weight and possessing a pH greater than 12.6. This mud, sometimes hereinafter referred to as type A mud, is expeditiously converted to the hereinabove described relatively high calcium content shale control mud, that is, a mud characterized by an aqueous phase saturated with respect to calcium hydroxide, having a dissolved calcium ion concentration greater than 200 parts per million by weight and having a pH less than 12.6, sometimes hereinafter referred to as type B mud, when the relatively low calcium content (type A mud) becomes contaminated with or is expected to become contaminated with heaving shale material or the like, by adding to or otherwise incorporating in the type A mud a water soluble calcium salt such as calcium chloride. Basis for the conversion of a type A mud to a type B mud by the simple addition of a water soluble calcium salt thereto resides in the fact that an aqueous phase saturated with calcium hydroxide, such as is present in a simple water base drilling mud which has an aqueous phase (filtrate) saturated with calcium hydroxide, has a pH of 12.6 and a dissolved calcium ion concentration of less than about 200 parts per million by weight. The addition of a strong base, such as an alkali metal hydroxide, e. g., sodium hydroxide, to this type mud will increase the pH of the mud to a value greater than 12.6 but, at the same time, the common ion effect (added hydroxyl ions generated by the strong base) will suppress the solubility of calcium hydroxide in the aqueous phase thereby reducing the dissolved calcium ion concentration therein. On the other hand, this mud, which might be called a type A mud, can be converted to the so-called type B mud which is very effective as a shale control mud, by the straightforward addition of a water soluble calcium salt thereto. The addition of the water soluble salt will increase the dissolved calcium ion concentration in the aqueous phase to a value greater than 200 parts per million by weight and this increased concentration of the calcium ion due to the common ion effect will form and precipitate calcium hydroxide from solution with the result that the hydroxyl ion concentration in solution is reduced, thereby lowering the pH to a value something less than 12.6, such as a value in the range 11.2–12.5.

In a preferred embodiment of the practice of this invention the clay dispersing agent employed in the type A mud is compatible with the resulting type B mud. Preferably the same clay dispersing agent is employed in the type A mud and in the type B mud.

A type A mud in accordance with a practice of this invention may be suitably prepared by adding to a clay water suspension, such as to a native hole mud or to a mud which has added thereto a suitable amount of a bentonitic type clay, a sufficient amount of lime and sodium hydroxide together with a suitable thinning or clay dispersing agent, such as calcium lignosulfonate. The lime should be added in an amount sufficient to substantially saturate the aqueous phase of the mud and the sodium hydroxide should be added in an amount sufficient to increase the pH of the aqueous phase to a value greater than 12.6, such as a value in the range 12.7–13.5, more or less, and in an amount sufficient to reduce the dissolved calcium ion concentration to less than 200 parts per million by weight, such as a value in the range 50–150 parts per million by weight. If desired, the direct addition of lime (calcium hydroxide) to the drilling mud in the preparation of a type A mud may be avoided by the generation of calcium hydroxide in situ within the drilling mud. The in situ generation of calcium hydroxide may be achieved by incorporating in the aqueous drilling mud suitable amounts of a water soluble calcium salt, such as calcium chloride, an alkali metal hydroxide such as sodium hydroxide, which together by metathetical reaction produce calcium hydroxide and salt (NaCl). The alkali metal hydroxide should be present in stoichiometric excess as compared to the water soluble calcium salt but in an amount so that the resulting produced calcium hydroxide is at least sufficient to saturate the aqueous phase.

In accordance with the teachings of this invention the conversion of a low calcium relatively high pH type A mud to a high calcium relatively low pH type B mud is theoretically effected by the addition of a soluble calcium salt to the type A mud. In actual field practice, however, it is sometimes desirable to convert a type A mud to a type B mud by adding to the type A mud a reagent admixture comprising a water soluble calcium salt, lime, and a suitable dispersing agent, e. g., calcium chloride, lime, calcium lignosulfonate, respectively, in suitable proportions. These materials may be added separately or simultaneously by means of a reagent admixture comprising these materials, viz., water soluble calcium salt ($CaCl_2$) and dispersing agent (calcium lignosulfonate) in the weight ratio range 1:2–10:2–10, more or less.

A type A mud as described hereinabove is a relatively inexpensive mud and a simple mud to prepare and maintain. However, a type A mud is not a very satisfactory mud to be employed when drilling through heaving shale. It is for this reason that the type A mud is converted to the so-called type B mud when heaving shale is expected to be penetrated or is being penetrated during the drilling operation.

One distinguishing characteristic of a type A mud, particularly as compared with a conventional high pH lime mud, such as a limed red mud, is that the mud alkalinity ($P_m$) (indicative of the amount of lime and caustic soda in the mud) of a type A mud is usually in the range 8–10 whereas the mud alkalinity of a limed red mud is usually in the range 20–30. Further, the filtrate alkalinity ($P_f$) of a type A mud is usually in the range 1.5–2.0. On the other hand, the mud alkalinity of a type B mud is in the range 8–10 and the filtrate alkalinity ($P_f$) in the range 0.2–1.1.

The following example is exemplary of the practice of this invention. In a drilling operation a hole mud is converted to a low calcium content, relatively high pH mud, pH greater than 12.6 usually in the range 12.7–13.2, such as a type A mud, by the addition to the native mud of suitable amounts of calcium hydroxide, caustic soda and a clay dispersing agent, such as Kembreak (calcium lignosulfonate). The lime is added in an amount at least sufficient to substantially saturate or saturate the aqueous phase in the mud, such as an amount in the range 1–3 lbs. per barrel of mud. The caustic soda is added in an amount to increase the pH of the aqueous phase of the mud to a value greater than 12.6, such as a value in the range 12.7–13.2, and in an amount sufficient to suppress the solubility of the calcium ions in the filtrate phase to a value of less than 200 parts per million by weight, such as a value in the range 90–150 parts per million by weight. An amount of caustic soda in the range 0.2–2 lbs. per barrel of mud is usually sufficient. The dispersing agent, calcium lignosulfonate, is added in an amount sufficient to effectively thin the mud and to satisfactorily disperse the clay particles therein. Usually an amount of the dispersing agent in the range 1–5 lbs. per barrel is sufficient. Drilling with this type mud (type A mud) is then carried on until a heaving shale formation is penetrated or is expected to be penetrated during the drilling operation. Thereupon the type A mud is converted readily and inexpensively to a type B mud which is eminently satisfactory for drilling through heaving shale by adding to the type A mud a water soluble calcium salt in an amount sufficient to increase the dissolved calcium ion concentration in the aqueous phase to a value greater than 200 parts per million by weight, such as a value in the range 300–1000 parts per million by weight. The addition of the water soluble calcium salt also leads to a reduction of the pH in the aqueous phase to a value less than 12.6, such as a value in the range 11.2–12.5. There can also be added to the type A mud being converted, either simultaneously or separately with the water soluble calcium salt, an amount of lime (calcium hydroxide) and a clay dispersing agent (calcium lignosulfonate), preferably the same type clay dispersing agent employed in the preparation of the type A mud.

Further illustrative of the practice of this invention a typical unweighted type B mud such as might be produced by converting a type A mud in accordance with this invention, and containing 1½ lbs. of calcium chloride, 3 lbs. of calcium lignosulfonate and 2 lbs. of lime per barrel of drilling mud would exhibit the following properties:

Mud weight_____ About 10 lbs. per gallon.
Mud viscosity____ About 40 seconds API (1500/1 qt).
Gel strength—
   0 min_____ 0 gram.
  10 min_____ About 5–10 grams.
$P_f$ [1]_____ 0.5.
$M_f$ [2]_____ 1.0.
$P_m$ [3]_____ 8–10.
Free lime_____ 1.0 lb. per barrel.
Chloride ion_____ About 3000 p. p. m. above the value in mud prior to conversion.
Calcium ion_____ About 400 p. p. m. as determined by the standard versenate method described in API Code RP-29.
pH_____ About 11.9.
Water loss_____ About 8 cc. after the addition of 4 lbs. of starch per barrel of drilling fluid.

[1] $P_f$ is defined as number of cc. of N/50 $H_2SO_4$ required to titrate 1 cc. of aqueous phase (filtrate) of drilling fluid to a phenolphthalein end point and is a measure of the soluble hydroxyl ion content.
[2] $M_f$ is defined as number of cc. of N/50 $H_2SO_4$ required to titrate 1 cc. of aqueous phase (filtrate) of drilling fluid to methyl orange end point and is a measure of the soluble hydroxyl and carbonate ion content.
[3] $P_m$ is defined as number of cc. of N/50 $H_2SO_4$ required to titrate 1 cc. of the whole mud.

As will be apparent to those skilled in the art many modifications and changes are possible in the practice of this invention without departing from the spirit or scope thereof as set forth in the foregoing specification and in the accompanying claims.

We claim:
1. In the drilling of a bore hole wherein a drilling fluid is passed through the bore hole during the drilling operation into contact with the wall of said bore hole, the improvement which comprises employing a first aqueous drilling fluid containing hydratable clayey material dispersed in a first alkaline aqueous phase which consists essentially of a saturated aqueous calcium hydroxide solution, said first aqueous phase having a pH greater than 12.6 and having dissolved therein a calcium ion concentration not greater than 200 parts per million by weight, said first alkaline aqueous phase being produced by the addition to said first aqueous drilling fluid of an amount of lime sufficient to form therein a saturated aqueous solution of calcium hydroxide and by the addition of an amount of sodium hydroxide sufficient to render the pH of the resulting first aqueous phase greater than 12.6, subsequently when the bore hole being drilled penetrates or is anticipated to penetrate a heaving shale formation and during the aforesaid drilling operation converting said first drilling fluid to a second aqueous drilling fluid containing hydratable clayey material dispersed in a second alkaline aqueous phase which consists essentially of a saturated aqueous calcium hydroxide solution, said second aqueous phase having dissolved therein a calcium ion concentration greater than 200 parts per million by weight and having a pH not greater than 12.6, the aforesaid conversion having been effected during the aforesaid drilling operation by the addition to said first drilling fluid of an amount of a water soluble calcium salt having a solubility in water greater than that of calcium hydroxide sufficient to increase the dissolved calcium ion concentration in the resulting second aqueous phase to a value greater than 200 parts per million by weight.

2. A method in accordance with claim 1 wherein said first aqueous phase is prepared by adding to said first drilling fluid an amount of lime in the range of 1–5 lbs. per barrel of said first drilling fluid and an amount of sodium hydroxide in the range 0.2–4 lbs. per barrel of said first drilling fluid and wherein said second aqueous phase is prepared by adding to said first drilling fluid an amount of said calcium salt in the range 2–10 lbs. per barrel of said first drilling fluid sufficient to impart to the resulting second aqueous phase a dissolved calcium ion concentration therein greater than 200 parts per million by weight and to decrease the pH of the resulting second aqueous phase to a value less than 12.6.

3. A method in accordance with claim 1 wherein the calcium ion concentration in said first aqueous phase is in the range 50–150 parts per million by weight, wherein the pH of said first aqueous phase is in the range 12.7–13.7, wherein the calcium ion concentration in said second aqueous phase is in the range 300–1000 parts per million by weight and wherein the pH of said second aqueous phase is in the range 11.2–12.5.

References Cited in the file of this patent

UNITED STATES PATENTS

| | | |
|---|---|---|
| 1,819,646 | Loomis et al. | Aug. 18, 1931 |
| 2,304,256 | Huebel | Jan. 15, 1940 |
| 2,491,437 | Perkins | Dec. 13, 1949 |
| 2,802,783 | Weiss et al. | Aug. 13, 1957 |